United States Patent
Yoon

(10) Patent No.: US 10,005,189 B2
(45) Date of Patent: Jun. 26, 2018

(54) EXTENSIBLE AND RETRACTABLE ARM MECHANISM, AND ROBOT ARM

(71) Applicant: Life Robotics Inc., Tokyo (JP)

(72) Inventor: Woo-Keun Yoon, Tokyo (JP)

(73) Assignee: Life Robotics Inc., Tokyo (JP)

( * ) Notice: Subject to any disclaimer, the term of this patent is extended or adjusted under 35 U.S.C. 154(b) by 0 days. days.

(21) Appl. No.: 15/262,015

(22) Filed: Sep. 12, 2016

(65) Prior Publication Data

US 2016/0375591 A1    Dec. 29, 2016

Related U.S. Application Data

(63) Continuation of application No. PCT/JP2015/056006, filed on Feb. 28, 2015.

(30) Foreign Application Priority Data

Mar. 14, 2014    (JP) .................................. 2014-051982

(51) Int. Cl.
| | |
|---|---|
| *B25J 17/00* | (2006.01) |
| *B25J 18/02* | (2006.01) |
| *B25J 18/06* | (2006.01) |

(52) U.S. Cl.
CPC ............. *B25J 18/025* (2013.01); *B25J 18/06* (2013.01); *Y10S 901/25* (2013.01)

(58) Field of Classification Search
CPC ............. B25J 18/025; B25J 9/05; B25J 9/046
See application file for complete search history.

(56) References Cited

U.S. PATENT DOCUMENTS

| | | | | | |
|---|---|---|---|---|---|
| 2,574,657 | A | * | 11/1951 | Pierce ....................... | B66F 3/06 254/1 |
| 5,139,464 | A | * | 8/1992 | Lehnert ................. | E04H 12/185 474/155 |
| 5,355,643 | A | * | 10/1994 | Bringolf ................... | B66F 3/06 24/418 |
| 5,970,701 | A | * | 10/1999 | Roden ..................... | F16G 13/20 59/78 |
| 6,419,603 | B1 | * | 7/2002 | Grasl ....................... | B66F 3/06 474/148 |

(Continued)

FOREIGN PATENT DOCUMENTS

| | | |
|---|---|---|
| JP | 2001-82553 A | 3/2001 |
| JP | 2014-1791 A | 1/2014 |
| WO | 2011/152265 A1 | 12/2011 |

OTHER PUBLICATIONS

International Search Report issued in PCT/JP2015/056006, dated Jun. 23, 2015, with translation (5 pages).

(Continued)

*Primary Examiner* — Zakaria Elahmadi
(74) *Attorney, Agent, or Firm* — Nakanishi IP Associates, LLC

(57) ABSTRACT

An extendable and retractable arm mechanism includes a first structure group formed by coupling a plurality of first structures and a second structure group formed by coupling a plurality of second structures. Each of the first structures includes lock part for fixing the second structures. When the first structure group and the second structure group extend, the lock part fixes the second structures to the first structures.

3 Claims, 12 Drawing Sheets

(56) References Cited

U.S. PATENT DOCUMENTS

| | | | | |
|---|---|---|---|---|
| 7,621,078 B2* | 11/2009 | Phelan | ................... | B66F 3/06 |
| | | | | 254/DIG. 6 |
| 7,905,156 B2* | 3/2011 | Scott | ................... | B66D 1/54 |
| | | | | 74/89.21 |
| 8,534,004 B2* | 9/2013 | Wasson | ............... | E04H 12/182 |
| | | | | 52/114 |
| 2009/0071281 A1* | 3/2009 | Fisk | ................... | B25J 5/005 |
| | | | | 74/490.03 |
| 2010/0051424 A1* | 3/2010 | Suko | ................... | B66F 3/06 |
| | | | | 198/850 |
| 2012/0024091 A1* | 2/2012 | Kawabuchi | ............ | B25J 9/045 |
| | | | | 74/37 |
| 2013/0068061 A1* | 3/2013 | Yoon | ................... | B25J 18/025 |
| | | | | 74/490.05 |

OTHER PUBLICATIONS

Written Opinion of International Searching Authority issued in PCT/JP2015/056006, dated Jun. 23, 2015 (7 pages).

Realtime Control of Robotic Arm for Persons with Upper-limb Disabilities (RAPUDA), 28th Annual Conference of Robotics Society of Japan Yokoshu, published on Sep. 22, 2010 (2 page).

* cited by examiner

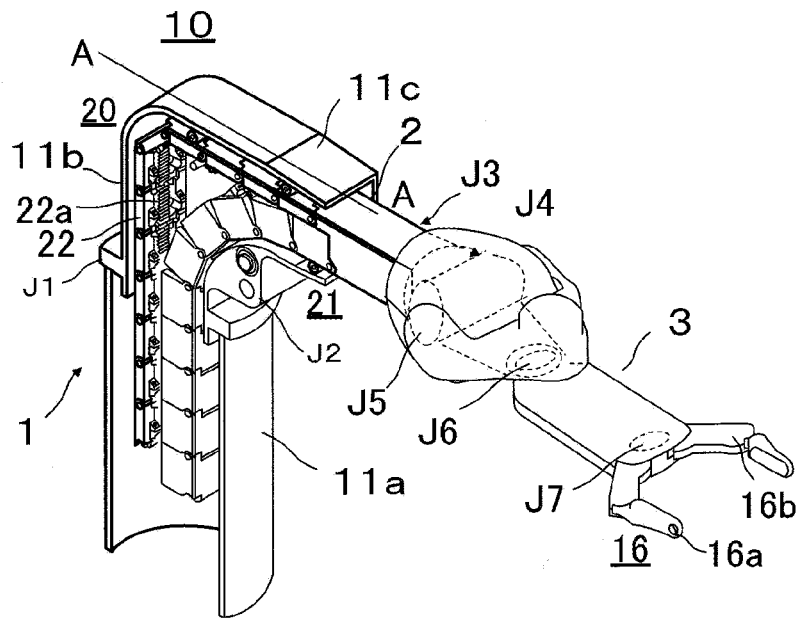
F I G. 1
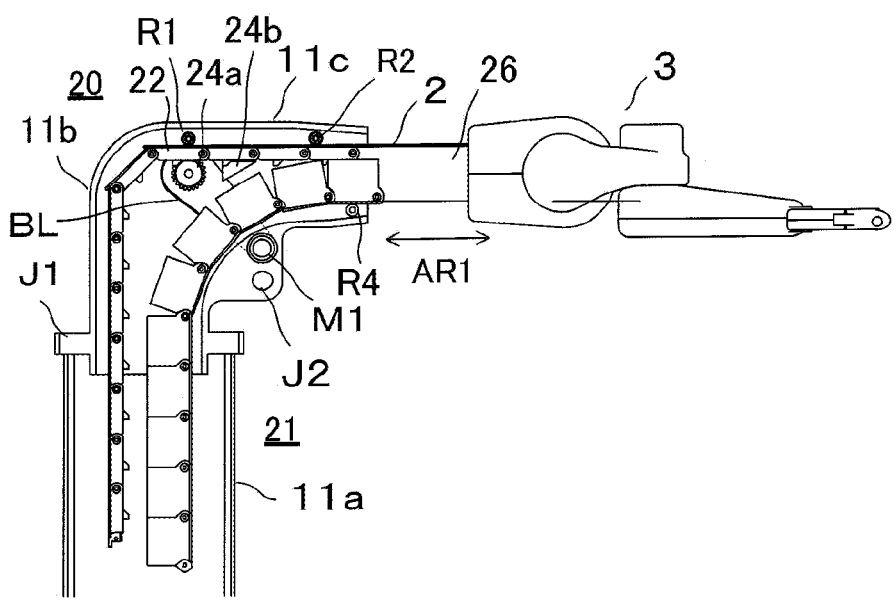
F I G. 2

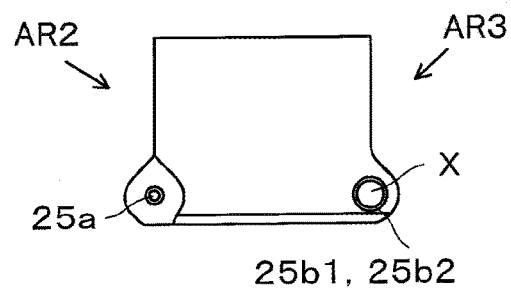
F I G. 5A
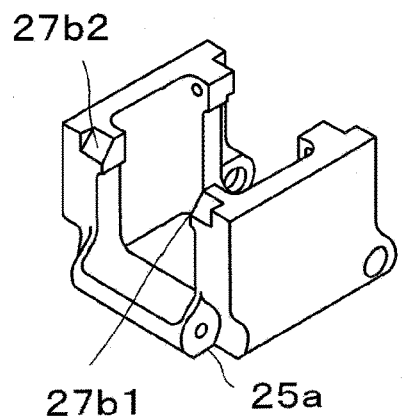
F I G. 5B
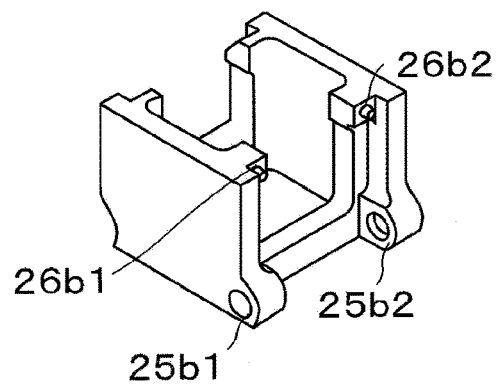
F I G. 5C

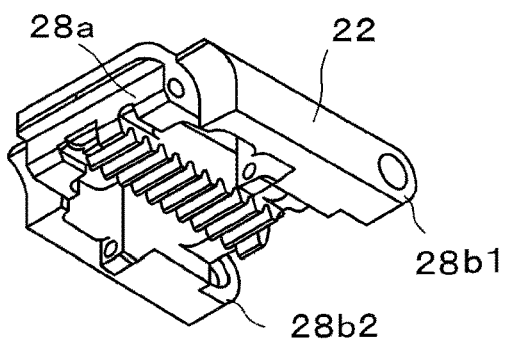
F I G. 7C
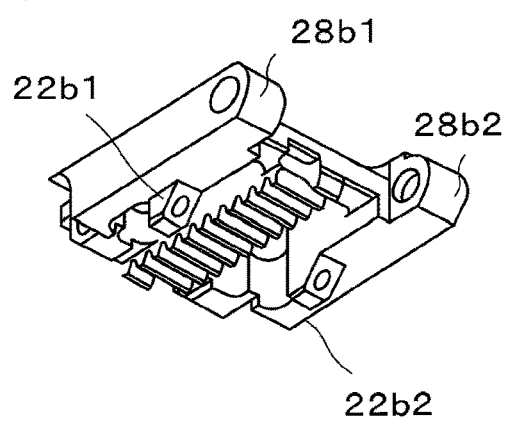
F I G. 7D
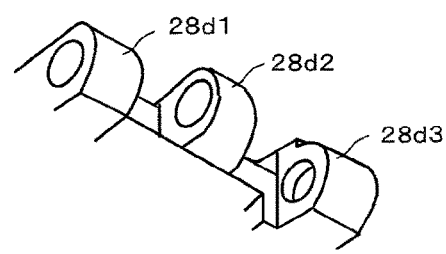
F I G. 7E

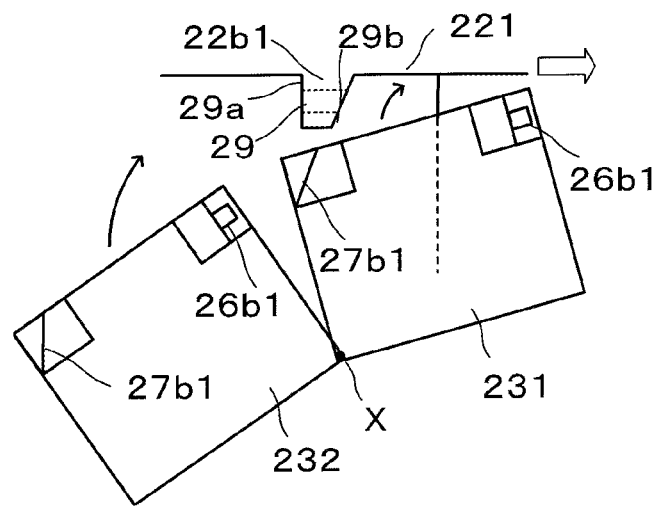
F I G. 8A
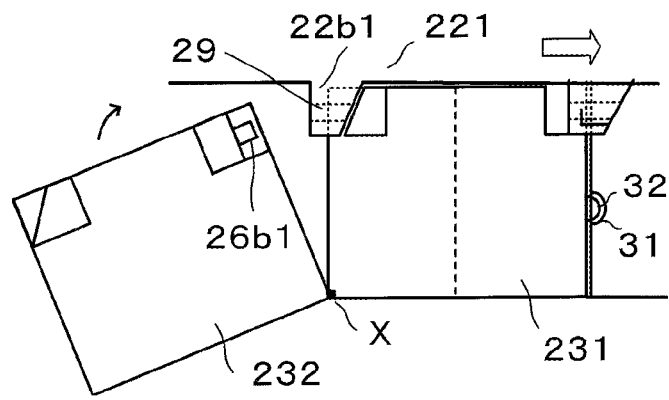
F I G. 8B

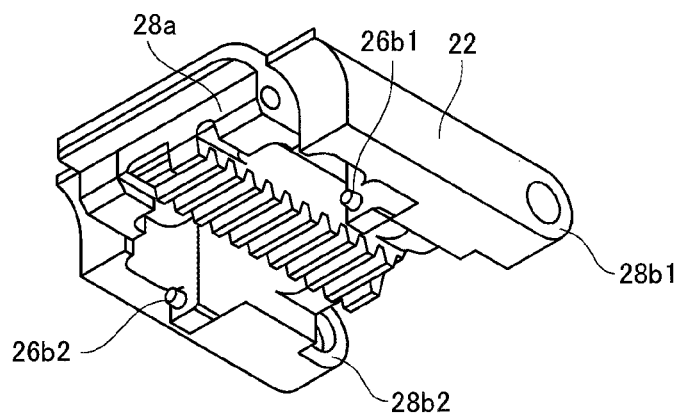
F I G. 12A
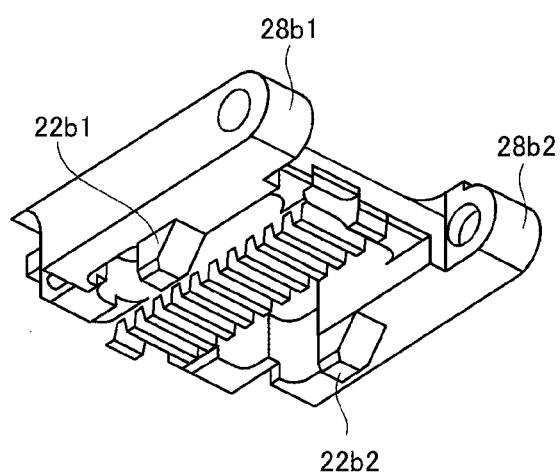
F I G. 12B

EXTENSIBLE AND RETRACTABLE ARM MECHANISM, AND ROBOT ARM

CROSS-REFERENCE TO RELATED APPLICATIONS

This application is a continuation application of International Patent Application No. PCT/JP2015/056006 filed on Feb. 28, 2015, which is based upon and claims the benefit of priority from the Japanese Patent Application No. 2014-051982, filed Mar. 14, 2014 the entire contents of which are incorporated herein by reference.

FIELD

The present invention relates to an extensible and retractable arm mechanism of an arm used for, for example, a robot, and a robot arm.

BACKGROUND

Many robots are adopted in, for example, a factory for labor savings. Most of the robots are operated while giving priority to, for example, speed, accuracy and efficiency.

In recent years, robots have been used to take care of people. In such a field, robots operate in the neighborhood of people, and considerations from another aspect, such as prevention of danger from being posed on people, need to be given.

As regards, for example, a robot arm, a linearly-extensible and retractable arm mechanism adopting, instead of a rotational joint, a linear motion joint for making an arm extend and retract, which allows the arm to linearly extend when the arm extends, and requires relatively less space when the arm retracts, has been conceived and been in the actual use.

As the linearly-extensible and retractable arm mechanism, a structure including two structure assemblies which form a rigid arm part when they are placed one upon another and extended by a drive mechanism, but are bent and stored in an arm support when they are separated by an inverse rotation of the drive mechanism, has been known.

However, the two structures of the linearly-extensible and retractable arm mechanism placed one upon another may be separated in their tracks, and do not form a sufficiently-secure rigid body.

CITATION LIST

Patent Literature

[Patent Literature 1] International Publication No. WO 2011/152265

SUMMARY

The purpose is to provide an extensible and retractable arm mechanism and a robot arm which are reliably and smoothly extensible and retractable.

An extensible and retractable arm mechanism according to the present embodiments includes a first structure group formed by coupling a plurality of first structures and a second structure group formed by coupling a plurality of second structures. Each of the first structures includes lock part for fixing the second structures. When the first structure group and the second structure group extend, the lock part fixes the second structures to the first structures.

BRIEF DESCRIPTION OF THE DRAWINGS

FIG. 1 is a perspective view showing a configuration of an extension arm mechanism in a retracted state according to a first embodiment.

FIG. 2 is a side-sectional view showing a configuration of the extension arm mechanism in a retracted state according to the first embodiment.

FIG. 5A is a side view showing a configuration of a lower structure in the first embodiment.

FIG. 5B is a perspective view of the lower structure in the first embodiment.

FIG. 5C is a perspective view of the lower structure in the first embodiment viewed from another position.

FIG. 7C is a perspective view of the upper structure in the first embodiment viewed from below.

FIG. 7D is a perspective view of the upper structure in the first embodiment viewed from another lower position.

FIG. 7E shows another example of the bearing of the upper structure in the first embodiment.

FIG. 8A illustrates an operation which the lower structure gages with the lock part of the upper structure.

FIG. 8B illustrates an operation in which the lower structure engages with the lock part of the upper structure.

FIG. 12A is a rear perspective view showing another example of the lock structure of the upper structure in the first embodiment.

DETAILED DESCRIPTION

Figure 3:
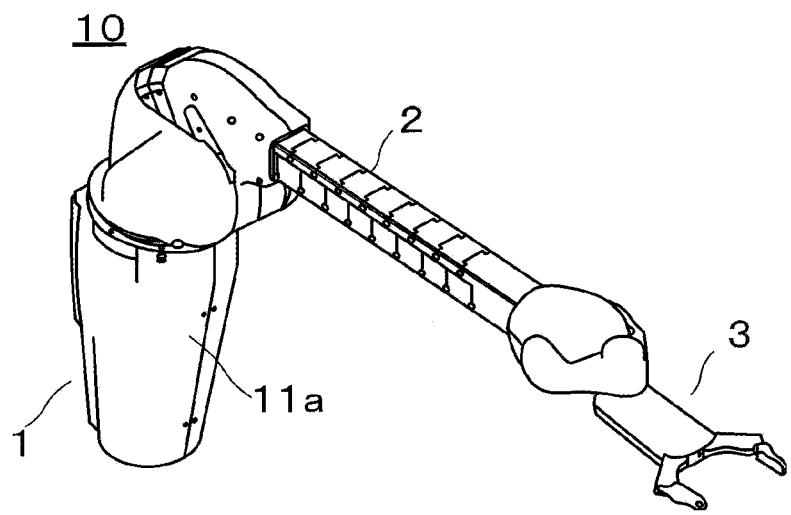
FIG. 3 is a perspective view showing a configuration of the extension arm mechanism in an extended state according to the first embodiment.

Hereinafter, embodiments of the present invention will be described with reference to the drawings.

First Embodiment

FIG. 1 is a perspective view showing a configuration of an extension arm mechanism in a retracted state according to a first embodiment, and FIG. 2 is a side-sectional view showing the same. A robot arm 10 roughly comprises an arm support 1, an arm part 2 and a hand part 3.

The arm part 2 comprises, as main structures, an upper structure group (first structure group) 20 including a plurality of flat upper structures (first structures, first pieces or first blocks) 22 bendably coupled each other and a lower structure group (second structure group) 21 including a plurality of lower structures (second structures, second pieces or second blocks) 23 bendably coupled each other on their bottom plate side and shaped like a trench having, for example, a U-shaped section. The tip (top) upper structure 22 of the plurality of upper structures is connected to the tip lower structure 23 of the plurality of the lower structures 23. By keeping an engaged state (a connected state or a joined state) of the upper structure group 20 and the lower structure group 21, each bend is locked, and the arm part 2 keeps a columnar body having predetermined rigidity. By separating the upper structure group 20 from the lower structure group 21, the columnar body is freed and the upper structure group 20 and the lower structure group 21 each return to a bent state. To keep the engaged state of the upper structure group 20 and the lower structure group 21, a lock structure is provided. The lock structure is made of a through-hole (lock pin hole or concave) 29 of lock parts 22*b*1 and 22*b*2 provided on the upper structure 22 and projections (lock pins or fitting parts) 26*b*1 and 26*b*2 of lock part receivers 27*b*1 and 27*b*2 provided on the lower structure part 23. By inserting the lock pins 26*b*1 and 26*b*2 in the lock pin hole 29, the engaged state of the upper structure group 20 and the lower structure group 21 is kept and, by pulling the lock pins 26*b*1 and 26*b*2 out of the lock pin hole 29, the upper structure group 20 and the lower structure group 21 return to a bendable state.

(Arm Support)

The arm support 1 comprises a hollow structure formed around a first rotational joint J1 attached to a fixing base, which is not shown, and supports the arm part 2 and the hand part 3. The arm support 1 may be fixed to a ground surface G, such as a floor, without using the fixing base.

The arm support 1 comprises a first support part 11*a* attached to a base, which is not shown, a second support part 11*b*, a third support part 11*c*, a first rotational joint J1 (rotational joint means) and a second rotational joint J2.

The first support part 11*a* and the second support part 11*b* each have a hollow structure as shown in FIG. 1. One end of the second support part 11*b* is fixed to the first rotational joint J1.

The third support part 11*c* also has a hollow structure, and communicates with the first support part 11*a* and the second support part. Some structural elements of the arm part 2 to be described later are configured to be contained in the first support part 11*a*, the second support part 11*b* and the third support part.

The first rotational joint J1 is provided between the first support part 11*a* and the second support part 11*b*. The first rotational joint J1 is provided around an upper center part of the arm support 1, and functions as a rotational joint while supporting the second support 11*b*. For example, the first rotational joint J1 is configured as a rotational joint whose rotating shaft is the central axis of the arm support 1, that is, the central axis of the first support part 11*a* and the second support part 11*b*. As the first rotational joint J1 rotates, the second support part 11*b*, the third support part 11*c*, the arm part 2 and the hand part 3 horizontally rotate about the rotating shaft.

The second rotational joint J2 is located at an end of the second support part 11*b* on the arm part 2 side, and is configured as a rotational joint having a rotating shaft orthogonal to the axis of the arm support 1. As the second rotational joint J2 rotates, the third support part 11*c*, the arm part 2 and the hand part vertically rotates about the rotating shaft of the second rotational joint J2 relative to the arm support 1.

The second rotational joint J2 is configured to keep such an angle and a distance from the central axis of the arm support 1 as not to firmly hold an object between the arm support 1 and the arm part 2.

In this embodiment, the arm support 1 stands upright on the ground surface G; however, the arm support 1 may form any predetermined angle with respect to the ground surface G.

(Hand Part)

The hand part 3 is provided on the tip of the arm part 2, as shown in FIG. 1. The hand part 3 comprises a fourth rotational joint J4, a fifth rotational joint J5, a sixth rotational joint J6, a seventh rotational joint J7, a first finger 16*a* and a second finger 16*b*. The first finger 16*a* and the second finger 16*b* constitute a two-finger hand 1G. The fourth rotational joint J4 is a rotational joint whose rotating shaft is the central axis (i.e., arm axis) of the arm part 2 along the extension direction of the arm part 2. As the fourth rotational joint J4 rotates, the hand part 3 from the fourth rotational joint J4 to its tip rotates about the rotating shaft.

The fifth rotational joint J5 is a rotational joint having a rotating shaft orthogonal to the arm axis. As the fifth rotational joint J5 rotates, the two-finger hand 16 from the fifth rotational joint J5 to its tip rotates about the rotating shaft.

The sixth rotational joint J6 is a rotational joint having a rotating shaft orthogonal to both the arm axis and the fifth rotational joint J5. As the sixth rotational joint J6 rotates, the two-finger hand 16 rotates about the rotating shaft.

The seventh rotational joint J7 rotates the first finger 16*a* and the second finger 161*b* of the two-finger hand 16. Namely, as the first finger 16*a* and the second finger 16*b* are rotated by the seventh rotational joint J7 so that the tip of the first finger 16*a* comes near the tip of the second finger 16*b*, the two-finger hand 16 closes to perform an action to grasp an object.

On the other hand, an action to release a grasped object is performed by the tip of the first finger 16*a* and the tip of the second finger 16*b* moving away from each other to open the two-finger hand 16. A cylindrical object such as a cup may also be held by inserting the two-finger hand 16 into the object and opening the two-finger hand 16.

In the present embodiment, the two-finger hand 16 is used as the hand part 3. However, the hand part 3 of the present invention is not limited to the two-finger hand 16, and may have three or more fingers.

Moreover, fingers may not be used in the present invention. Instead, of the hand part 3, the arm part may have a tip connectable to various types of structures desired to be provided at a desired position with a desired posture. For example, a device having an image pickup function may be connected instead of the hand part 3.

The extensible and retractable arm mechanism according to the present invention is the proximal part of the hand part, and a hand may not be connected thereto.

(Arm Part)

The arm part 2 includes a linearly-extensible and retractable arm joint J3. The above-described hand part 3 is provided at the tip of the arm part 2. The two-finger hand 16 can be placed at a desired position with a desired posture by the arm support 1, the arm part 2 and the hand part 3. By extending the linearly-extensible and retractable arm joint shown in FIG. 1 from the retracted state, the hand part 3 can be extended further to grasp or release an object, and by retracting the joint, the hand part 3 can grasp or release a closer object.

FIG. 2 is a partial sectional view of the extensible and retractable arm mechanism shown by taking the robot arm along section line A-A shown in FIG. 1.

The arm part 2 mainly comprises the upper structure group 20 and lower structure group 21 constituting the linearly-extensible and retractable arm joint J3, and a drive mechanism 24 which drives the linearly-extensible and retractable arm joint J3.

The linearly-extensible and retractable area joint J3 enables the arm part 2 to extend or retract via the third support part 11c from the state where the arm part 2 is stored in the arm support 1 extending in the vertical direction of the robot arm 10 as shown in FIG. 1. At this time, the lower structure group 21 is positioned below the upper structure group 20 relative to the gravity direction.

The arm part 2 is formed by the upper structure group 20 and the lower structure group 21 overlapping each other to be rigid. The arm part 2 is rotated about the second rotational joint J2 by the second rotational joint J2.

Figure 6:
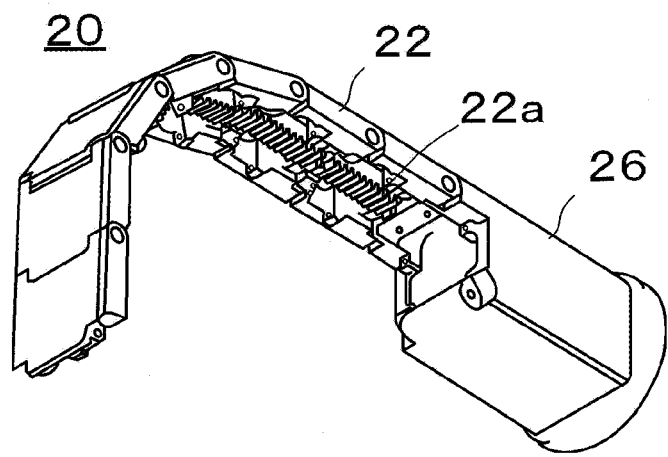
FIG. 6 is a perspective view of an upper structure group in the first embodiment viewed from below.

As shown in FIGS. 1 and 6, each upper structure 22 constituting the upper structure group 20 includes a concave-convex (uneven) structure 22a on its inner surface. The concave-convex structure (linear gear (rack)) 22a becomes continuous when the coupled upper structures 22 become linear. As shown in FIG. 2, the continuous concave-convex structure 22a is engaged with a gear wheel (pinion gear) 24a. The upper structures 22 are moved by an actuator which drives the gear wheel. Lock parts 22b1 and 22b2 shown in FIG. 7D are on the both sides of the concave-convex structure 22a, respectively. When the upper structures 22 are engaged with the lower structures 23, the lock parts 22b1 and 22b2 perform an important function.

The upper structure group 20 moves up and down in the vertical part and moves rightward and leftward in the horizontal part, and the lower structure group coupled thereto moves in the same directions. This action makes the arm part 2 extend and retract as indicated by arrow AR1. FIG. 3 shows a state where the arm part 2 is extended. The gear wheel 24a is provided near a position where the upper structures 22 become linear.

(Common Block Body)

A common block body 26 is provided at the tip (top) of the upper structure group 20 and the tip (top) of the lower structure group 21 as shown in FIGS. 2 and 6. The upper structure 22 adjacent to the common block body 26 is connected to the common block body 26, and the lower block structure 23 adjacent to the common block body 26 is also connected to the common block body 26. The common block body 26 has a shape made by integrating one upper structure 22 and one lower structure 23 as one body. When the arm part is extended, the common block body 26 serves as a leading edge for coupling the upper structures 22 and the lower structures together to form one rigid body.

In the present embodiment, the common block body 26 has an integrated shape. However, the common block body 26 of the present invention may take any shape unless the tips of the upper structure 20 and the lower structure 21 are unintentionally separated when the linearly-extensible and retractable arm joint J3 is retracted.

Therefore, the configuration is not limited to the above-described one. For example, the common block body 26 may be made by fixing one upper structure 22 to one lower structure 32 by an adhesive, welding or a screw.

(Lower Structure Group (Second Structure Group))

Figure 4:
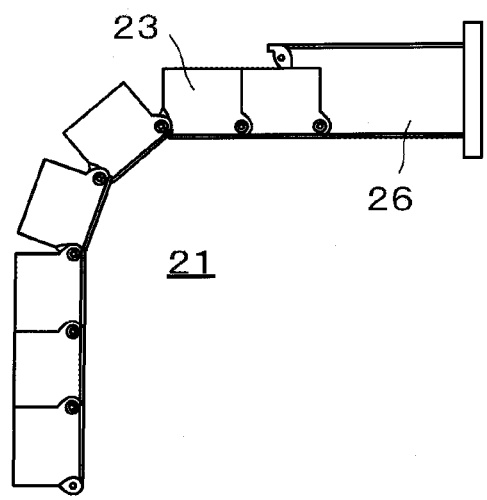
FIG. 4 is a side view showing a configuration of a lower structure group of the extension arm mechanism according to the first embodiment.

FIG. 4 shows a side view of the lower structure group 21. The lower structure group 21 includes a plurality of lower structures (second structures) 23. All the lower structures 23 from one end lower structure 23 to the other end lower structure 23 form one string. The lower structures 23 are coupled to one another via rotating shaft X in a direction orthogonal to rotating shaft X. The lower structures have the same width in a direction parallel to the rotating shaft.

Figure 5D:
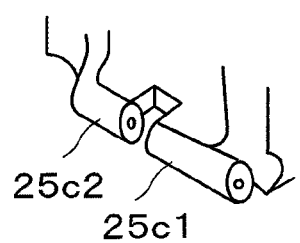
FIG. 5D shows another example of the rotating shaft of the lower structure in the first embodiment.
Figure 5E:
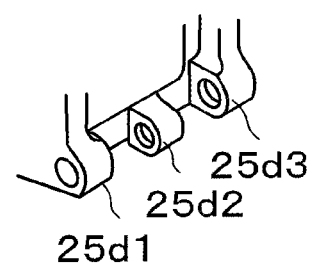
FIG. 5E shows another example of the bearing of the lower structure in the embodiment.

FIGS. 5A to 5E show a configuration of each of the lower structures 23 adjacent to one another. FIG. 5A is a side view of the lower structures 23. FIG. 5B is a perspective view of the lower structure 23 viewed in a direction indicated by arrow AR2 in FIG. 5A. FIG. 5C is a perspective view of the lower structure 23 viewed in a direction indicated by arrow AR3 in FIG. 5A. FIGS. 5D and 5E show modifications of the adjacent lower structures and are partial perspective views corresponding to FIGS. 5B and 5C.

The lower structure 23 has a hollow block structure whose top is open, and has a U-shaped section taken perpendicularly relative to the moving direction. On one side of the bottom surface relative to the moving direction, a rotating shaft (a rotated part) 25a rotatably supported by a through-hole of the adjacent lower structure 23 is provided. On the other side, bearing parts 25b1 and 25b2 which support the rotating shaft 25a of the adjacent lower structure 23 on its sides are provided. The bearing parts 25b1 and 25b2 and the rotating shaft 25a are provided with a through-hole. By inserting a pin into this common through-hole, the lower structures 23 are rotatably coupled. The through-hole may not be provided as long as the bearing parts 25b1 and 25b2 and the rotating shaft 25a are rotatable with respect to one another.

Namely, the rotating shaft 25a and the bearing parts 25b1 and 25b2 form a common rotating shaft X on the border between adjacent lower structures 23, thereby coupling the lower structures and allowing the lower structure 23 to rotate about the rotating shaft X.

Above the bearing parts 25b1 and 25b2, there are projections 26b1 and 26b2 inserted in holes of the upper structure 22. Above the both sides of the rotating shaft 25a, there are lock part receivers 27b1 and 27b2 which receive the lock parts 22b1 and 22b2.

In the configuration shown in FIGS. 5B and 5C, the coupling is achieved by one rotating shaft and two bearing parts. However, the rotating shaft may be separated into two parts, and three bearing parts may be accordingly provided. Namely, as shown in FIGS. 5D and 5E, one lower structure may have rotating shafts 25c1 and 25c2, and the adjacent lower structure may accordingly have three bearing parts 25d1, 25d2 and 25d3. Similarly, there may be more rotating shafts and corresponding bearing shafts.

As described above, the bottom parts of the lower structures are coupled, the lower structure group 21 can be bent down, whereas the lower structure group 21 cannot be bent up even if it is attempted since the sides of the adjacent lower structures strike against each other, and the bottom surfaces at most form a straight plane.

Providing the lower structure with the hollow block structure (frame structure) as described above is advantageous because the material of the center part can be removed, and light weight can be achieved.

(Upper Structure Group (First Structure Group))

FIG. 6 is a perspective view of the upper structure group 20 and the common block body 26 viewed from below. As shown in the figure, one end of the upper structure group 20 is fixed to the common block body 26. The coupled upper structures (first structures) 22 have a concave-convex structure 22a having a predetermined width approximately at their center.

The upper structure group 20 includes a plurality of upper structures 22. All the upper structures 22 from one end upper structure to the other end upper structure are coupled to one another to form a string. The upper structures are coupled via rotating shaft center Y in a direction orthogonal to rotating shaft center Y. The upper structures 22 have the same size in a direction parallel, to rotating shaft center Y, i.e., have the same width.

Figure 7A:
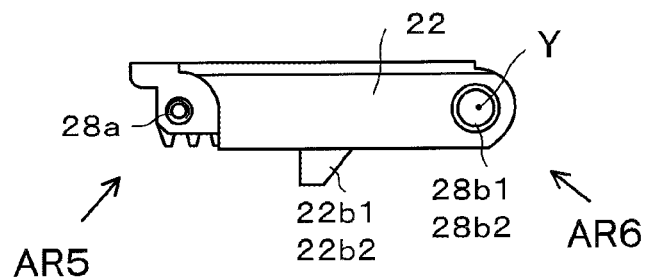
FIG. 7A is a side view showing a configuration of an upper structure in the first embodiment.
Figure 7B:
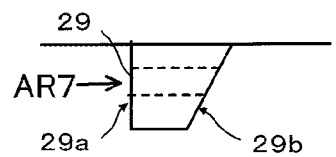
FIG. 7B is a side view showing a configuration of a lock part included in the upper structure in the first embodiment.

FIGS. 7A to 7D illustrate a configuration of each upper structure 22. FIG. 7A is a side view of the upper structure 22, and FIG. 7B shows a configuration of the lock part. FIG. 7C is a perspective view of the upper structure 22 viewed in arrow AR5 direction shown in FIG. 7A, and FIG. 7D is a perspective view of the upper structure 22 viewed in arrow AR6 direction shown in FIG. 7A.

The upper structure 22 is flat-shaped, includes a concave-convex structure 22a having a predetermined width at around its center relative to the moving direction, and comprises a pair of lock parts 22b1 and 22b2 on its sides. The upper structure 22 also includes a rotating shaft 28a and bearing parts 28b1 and 28b2 which receive the both ends of the rotating shaft 28a. Of course, there may be a bearing part at one end, instead of both ends.

The bearing parts 28b1 and 28b2 and the rotating shaft 28a are provided with a through-hole. By inserting a pin into the common through-hole, the upper structures 22 are rotatably coupled to one another.

Namely, the rotating shaft 28a and the hearing parts 28b1 and 28b2 from a common rotating shaft center Y on the border between adjacent lower structures 22, thereby coupling the upper structures and allowing the upper structure 23 to rotate about the rotating shaft center Y. The rotating shaft 28a and the bearing parts 28b1 and 28b2 are coupled by the common rotating shaft center Y. The through-hole may not be provided as long as the upper structure 22 is rotatable.

As shown in FIG. 7E, there may be three bearing parts 28d1, 28d2 and 28d3 and two corresponding rotating shafts.

Adjacent upper structures 22 have a common rotating shaft on their border, and rotate about the rotating shaft center Y.

Each upper structure 22 has a plate-like body, and adjacent upper structures 22 are coupled to each other. Thus, the upper structure group 20 can be bent down, whereas the upper structure group 20 cannot be bent up even if it is attempted, and the bottom surfaces at most form a straight plane. The coupling parts of the upper structures 22 are configured to prevent the upper structure group 20 from being bent up.

The pair of lock parts 22b1 and 22b2 provided on the both sides of the concave-convex structure 22a of the upper structure 22 are trapezoid as shown in the side view of FIG. 7B, and are located on the both sides of the concave-convex structure 22a of the upper structure 22 at approximately the center relative to the moving direction of the upper structure 22. Accordingly, the pair of lock parts 22b1 and 22b2 are symmetrical relative to the direction perpendicular to the extension and retraction direction of the upper structure. The present invention does not always require such symmetry.

One surface (rear surface relative to the moving direction of the time of extending) of the trapezoid of each of the pair of lock parts 22b1 and 22b2 is a rear vertical plane 29a, and the other surface (front surface relative to the moving direction of the time of extending) is a front inclined plane 29b. At approximately the center of the surfaces, a through-hole 29 is provided. When the string of the upper structure group 20 is engaged with that of the lower structure group 21, the pair of inclined surfaces 29b of the pair of lock parts 22b1 and 22b2 come into contract with the pair of lock part receivers 27b1 and 27b1 of the lower structure 23, and projections 26b1 and 26b2 of the lower structure 23 are fitted (inserted) in the through-hole 29 from left (arrow AR7).

This mechanism engages the upper structure 22 with the lower structure 23 when the arm part extends, whereby the upper structure 22 and the lower structure 23 are locked together to form a rigid body.

The through-hole 29 of the lock part need not be a through hole extending to the inclined surface 29b as long as the projections 26b1 and 26b2 can be inserted, and may be a depression with its left side open (the rear surface relative to the moving direction of the time of extending).

The projections 26b1 and 26b2 may be alternately provided or only one of them may be provided.

A fitting part (projection in the present embodiment) provided near the upper corner of the lower structure is fitted in and locked to the lock mechanism accordingly provided on the upper structure.

The fitting part fitted in the lock mechanism provided on the upper structure need not be always provided near the upper corner of the lower structure.

(Drive Mechanism)

Next, a drive mechanism for extending and retracting the arm part, i.e., a gear wheel 24a and an operation performed when the gear wheel is rotated will be described. The gear wheel 24a is engaged with the concave-convex structure 22a fixed on the lower surface of the upper structure 22.

As shown in FIG. 2, the gear wheel 24a is connected to a motor M1, which is drive means, by a belt BL. The forward and inverse rotation of the motor M1 rotates the gear wheel 24a. By the gear wheel 24a engaging with the concave-convex structure 22a of the upper structure 22, the upper structure group 20 moves in the arrow AR1 direction in the horizontal part thereof.

First, an operation performed when the arm part 2 extends will be described. When the motor M1 rotates the gear wheel 24a forward in a clockwise direction, adjacent upper structures 22 horizontally extend. The right ends of the upper structure group 20 and the lower structure group 21 are fixed by the common block body 26. The back surface (upper surface) of the upper structure group 20 is supported by upper rollers R1 and R2, and the back surface (lower surface) of the lower structure group 21 is supported by a lower roller R4. The upper rollers R1 and R2 may exert a pressing force downward, and the lower roller R4 upward. Furthermore a side roller may be provided on a side surface for support from the side. Herein, two upper rollers and one lower roller are shown; however, more or less upper rollers or lower rollers may be provided. There is no limit in the number of side rollers to be provided.

By inserting the structure assemblies between the upper rollers R1 and R2 and the lower roller R4, the upper structures 22 and the lower structures 23 are engaged from the ends of the structure assemblies fixed by the common block body 26. The upper structures 22 and the lower structures 23 are engaged while being shifted from each other in the moving direction by half the length of each structure.

At this time, the projections 26b1 and 26b2 of the lower structure 23 are fitted into the lock parts 22b1 and 22b2 of the upper structure 22. Referring to the schematic diagrams of FIGS. 8A and 8B showing this part, the operation of the mechanism will be described. The relationship between the lock part 22b2 and the projection 26b is the same as that between the lock part 22b1 and the projection 26b1. Thus, the relationship between the lock part 22b1 and the projection 26b1 is representatively described herein.

FIG. 8A shows a state where adjacent lower structures 231 and 232 approach the lock part 22b1 of the upper structure 221. FIG. 8B shows a state where lower structure 231 is in contact with the upper structure 221.

In the state shown in FIG. 8A, lower structure 231 has not come into contact with the lower surface of the upper structure 221 yet. However, as the upper structure group 20 and the lower structure group 21 move rightward, lower structure 231 gradually moves up as shown in FIG. 8B, and the upper surface of lower structure 231 comes into contact with the upper structure 221. The next lower structure 232 also gradually moves up, and the upper surface of lower structure 231 comes into contact with the lower surface of the upper structure 221. At this time, the projection 26b1 or 26b2 of the lower structure is inserted into the through-hole 29 of the lock part of the upper structure and is locked.

If this is seem from a different angle, the upper ends of the lower structure 23 are fixed by the lock part of the upper structure 22 from both sides.

Next, an operation performed when the arm part 2 is retracted (shortened) will be described. When the motor M1 inversely rotates the gear wheel 24a in the anticlockwise direction, adjacent upper structures 22 are retracted in the horizontal direction and hang down in the vertical direction. Since the right end of the upper structure group 20 is fixed to the lower structure group 21 by the common block body 26, the lower structures of the lower structure group are released from the engaged state with the upper structures of the upper structure group. At this time, to ensure and facilitate the release of the upper structures from the lower structures, a guide part 24b is provided perpendicularly to the moving direction around a position where the upper structures 20 are released from the lower structures 21.

The guide part 24b has a triangle section. As shown in FIG. 2, the guide part 24b has a right thin portion and a left thick portion, thereby making the lower structure group bent down, and enabling smooth downward rotation of each lower structure. Namely; the projections 26b1 and 26b2 inserted in the through-hole 29 of the upper structure are smoothly released.

This release operation is a reverse operation of the fitting operation shown in FIGS. 8A and 8B. Namely, lower structure 232 is first separated from the upper structure 221 as shown in FIG. 8B and then, lower structure 231 is separated from the upper structure 221 as shown in FIG. 8A. In this way, the lower structures 232 and 231 locked by the lock part 22b1 of the upper structure 221 are unlocked.

The shape of the guide part 24b is not limited to a triangle, and may be a body of revolution, such as a bearing, or a circle.

As described above, the upper structure 22 has the same length as the lower structure 23 in the moving direction, and shifted from the lower structure 23 by half the length. The both structure assemblies are fixed at their ends on the hand part side and are engaged with each other. A lock at the time of engagement is applied by receiving, at the through-holes of the pair of lock parts provided symmetrically relative to a direction perpendicular to the moving direction at approximately a center of the upper structure, a pair of projections which project in the moving direction at the same positions of the lower structure.

In contrast, at the other end of the upper part of the lower structure, a lock part receiver having an inclined surface in a right-angled direction relative to the moving direction. The lock part receiver is brought into contact with an inclined surface provided forward of the lock part when the lower structure rotates upward, and secures the lock at the lack part. This mechanism brings the upper structure group and the lower structure group into a rigid, state when they are engaged with each other.

When the upper structure group and the lower structure group are separated, the gear wheel 24a engaged with the uneven structure of the upper structure rotates in the upper anticlockwise direction in FIG. 2. As the lower structure is bent downward, i.e., each lower structure rotates about a central axis at a lower part, the lock part receiver of the lower structure is released from the inclined surface provided on the front surface facing in the moving direction of the lock part, and then the projection at the upper part of the lower structure is released from the lock part.

Accordingly, the upper structure group and the lower structure group brought into the rigid state as one body at the time of extension are released from the rigid state.

In the present embodiment, the lock part applies a lock by a projection being inserted into the through-hole of the lock part from behind, and thus produces the advantage of a reliable lock.

This mechanism causes the upper structure 22 and the lower structure 23 to engage with each other when the arm part is extended, and to be locked to form a rigid body.

The through-hole 29 of the lock part need not be a through-hole extending to the inclined surface 28b as long as the projections 26b1 and 26b2 can be inserted therein, and may be a depression with its left side open.

The through-hole of the lock part need not be a through-hole, and may be a depression for receiving the projection, which has a depth greater than the length of the projection.

As shown in FIG. 8B, in the above embodiment, at a position where adjacent structures hit each other, one lower structure may be provided with a pair of hemispherical depressions 31, and the other lower structure may be provided with a pair of hemispherical elastic projections 32 made of an elastic material such as rubber at corresponding positions. When the arm extends, and the lower structure group extends and engages with the upper structure group, the lower structures rotate and hit with one another. However, the elastic projections 32 are fitted into the depressions 31. Of course, the depressions and the elastic projections need not be hemispherical, and may be any depressions and elastic projections corresponding to the depressions.

FIG. 8B shows the case where a depression 31 is provided at around the center on the both sides of a lower structure located forward at the time of extension, and a corresponding rubber projection 32 is provided at around the center on the both sides of a lower structure connected rearward. It is possible to provide a rubber projection 32 at around the center on the both sides of a lower structure located forward at the time of extension, and provide a depression 31 at around the center on the both sides of a lower structure connected rearward.

This configuration produces the effect of suppressing, by the elasticity of the elastic projection, a shock and a noise caused when lower structures come into contact with each other.

In addition, not only for the contact portions of lower structures, but also those of upper structures and of an upper structure and a lower structure, the elastic projection and depression may be provided. This produces the effect of suppressing a shock and a noise.

(Modifications)

Figure 13A:
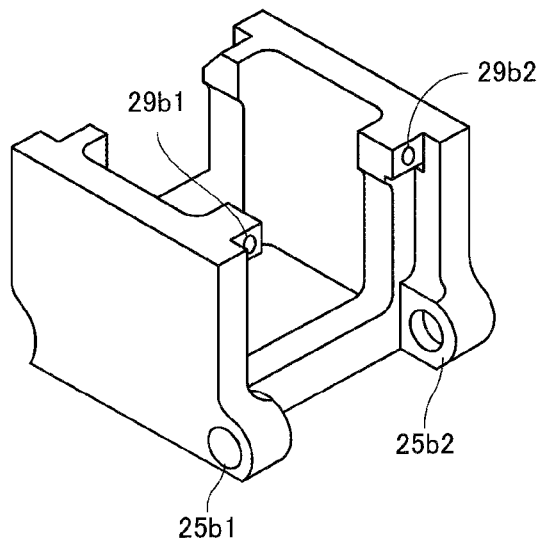
FIG. 13A is a front perspective view of a lower structure corresponding to the upper structure shown in FIG. 12A.
Figure 13B:
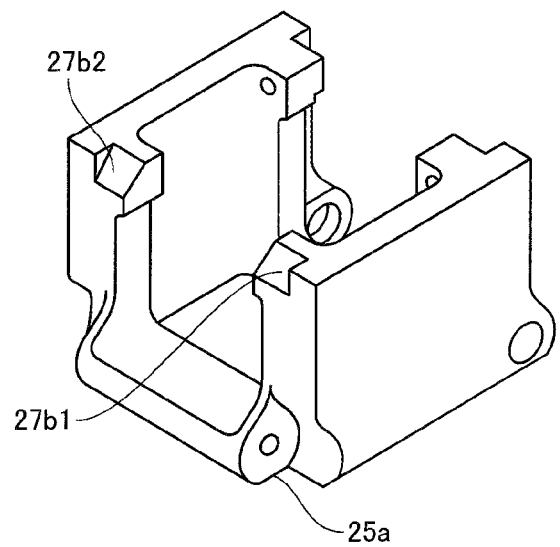
FIG. 13B is a rear perspective view of the lower structure shown in FIG. 13A.

According to the above descriptions, through-holes 29 are provided in the lock parts b1 and b2 of the upper structure 22, and the projections 26b1 and 26b2 of the lower structure 23 are inserted in the through-holes 29, whereby the lower structure 23 is fixed to the upper structure 22. However, it is possible to provide the lock parts 22b1 and 22b2 of the upper structure 22 with projections (lock pins) 26b1 ad 26b2 as shown in FIGS. 12A and 12B, and provide the lock part receivers 27b1 and 27b2 of the lower structure 23 with lock pin holes 29b1 and 29b2 as shown in FIGS. 13A and 13B. When the upper structure group 20 and the lower structure group 21 are joined, the lock parts 22b1 and 22b2 of the upper structure 22 are interposed between the lock part receivers 27b1 and 27b2 of adjacent lower structures 23, and the lock pins 26b1 and 26b2 of the upper structure 22 are fitted into the lock pin holes 29b1 and 29b2 of the lower structure 23, whereby the lower structure 23 is fixed to the upper structure 22. Accordingly, the joined state of the upper structure group 20 and the lower structure group 21 is maintained, and the arm part 2 as a columnar body having a predetermined rigidity is thereby formed.

Second Embodiment

The fitting part of the first embodiment has a configuration in which a projection of the lower structure is fitted into the through-hole of the lock part of the upper structure, thereby locking the upper structure and the lower structure. However, the configuration of the fitting part is not limited to the above configuration, and may have another configuration for locking the upper structure and the lower structure.

For example, the fitting part may have a configuration in which a lock part fixed to the both sides of the uneven structure of the upper structure is provided with a bent part in a horizontal direction, and a stick provided on the upper part of the lower structure is locked at the depressed part. This embodiment will be described below. The descriptions of the arm support, hand part, arm part, common block body and drive mechanism in the first embodiment apply to those in the second embodiment except for the descriptions of the upper structure and the lower structure. The elements other than the upper structure and the lower structure will be described using the same reference numerals as those used in the first embodiment.

Figure 9A:
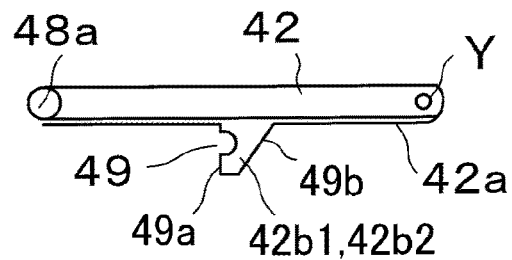
FIG. 9A is a side view showing a configuration of the upper structure in a second embodiment.
Figure 9B:
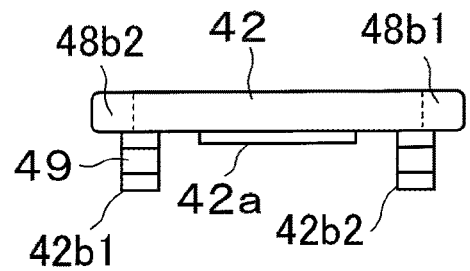
FIG. 9B is a front view showing a configuration of the upper structure in the second embodiment.
Figure 10:
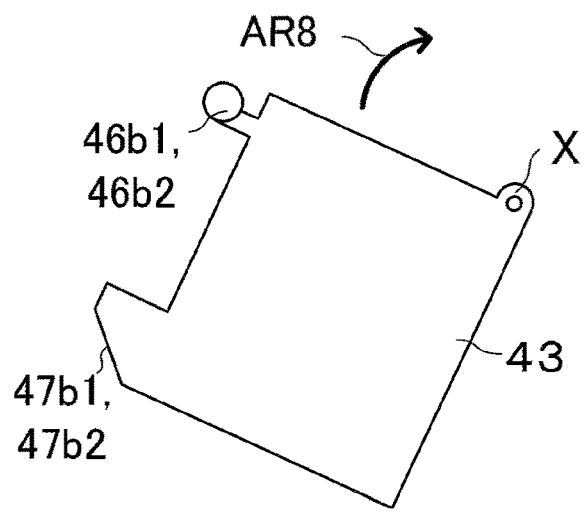
FIG. 10 is a side view showing a configuration of the lower structure in the second embodiment.
Figure 11A:
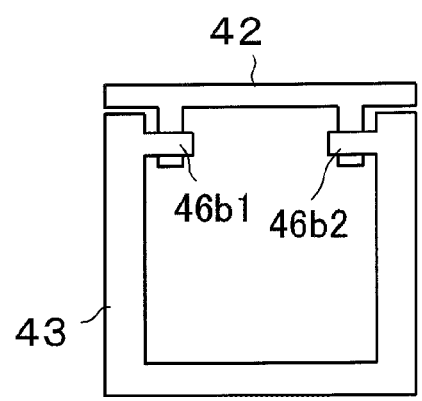
FIG. 11A illustrates a state where the lower structure engages with the lock part of the upper structure in the second embodiment.
Figure 11B:
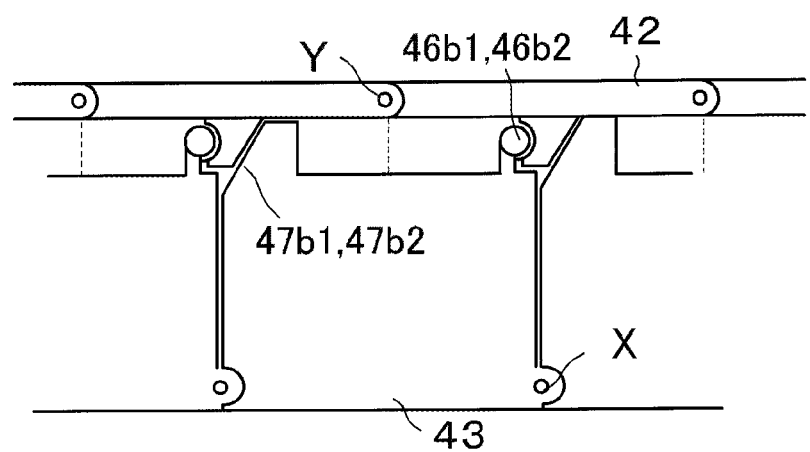
FIG. 11B is a side view showing a state where the lower structure is connected to the upper structure in the second embodiment.

FIGS. 9A and 9B show a configuration of the upper structure 42 in this embodiment, and FIG. 10 shows a configuration of the lower structure 43. FIG. 9A is a side view of the upper structure 42, and FIG. 9B is a front view of the upper structure 42 relative to the moving direction. FIG. 10 is a side view of the lower structure 43. FIG. 11A is a front view relative to the moving direction in a state where the lower structure 43 is coupled to the upper structure 42. FIG. 11B is a side view in the state where the lower structure 43 is coupled to the upper structure 42.

Like the above-described embodiment, upper structures 42 on a flat plate are connected to form an upper structure group, and lower structures 43 are connected to form a lower structure group.

(Lower Structure Group (Second Structure Group))

FIG. 10 shows a side view of the lower structure 43. The lower structure group includes a plurality of lower structures (second structures) 43, and all the lower structures 43 from one end to the other end are coupled to form a string. The lower structures 43 included in the lower structure group have the same width. FIG. 10 shows a state before the lower structure 43 is connected (joined) with the upper structure. By rotating the lower structure 43 about rotating shaft center X in arrow AR8 direction, the lower structure 43 is engaged with the upper structure 42.

As shown in FIG. 11A, inside an upper corner of the lower structure 43 which becomes the upper part when the lower structure 43 is rotated, the projections 46b1 and 46 b2 projecting inward are provided on the both sides. In contrast, as shown in FIG. 10, on the both sides of another upper corner of the lower structure 43, lock part receivers 47b1 and 47b2 for receiving the lock parts 42b1 and 42b2 are provided.

The bottom surface of each lower structure is connected to rotating shaft center X. Thus, the lower structure group can be bent down, whereas the lower structure group cannot be bent up even if it is attempted since the sides of the adjacent lower structures strike against each other, and the bottom surfaces at most form a straight plane.

(Upper Structure Group (First Structure Group))

The upper structure group comprises a plurality of upper structures (first structures) 42, and all the upper structures 42 from one end upper structure to the other end upper structure are connected to form a string. Upper structures 42 are rotatable downward via rotating shaft center Y about rotating shaft center Y. Thus, when the arm part 2 is extended, the upper structure 42 rotates upward to the maximum. However, the horizontal position, which is a condition in which the upper structure group is linear, is the limit.

One end of the upper structure group is fixed to the common block body 26. The connected upper structure 42 has an uneven structure 42a having a predetermined width at around its center. The upper structures included in the upper structure group have the same width.

The upper structure 42 is flat-shaped, and comprises lock parts 42b1 and 42b2 on the both sides of the uneven structure 42a at its center relative to the moving direction.

Adjacent upper structures 42 have a common rotating shaft on the border therebetween, and rotate about the rotating shaft center Y.

Each upper structure 42 has a plate-like body, and is connected with an adjacent upper structure 42. The coupling part of the upper structure 42 is configured not to be bent upward. Thus, the upper structure group can be bent downward, but cannot be bent up even if it is attempted, and the bottom surfaces at most form a flat surface.

A pair of lock parts 42b1 and 42b2 provided on the both sides of the uneven structure 42a of the upper structure 42 are trapezoid. One surface of the trapezoid is a vertical plane 49b, and the other surface is an inclined plane 49b. At around its center, a curve depression 49 shaped like a stick laterally extending is provided.

As shown in FIG. 11B, when the upper structure 42 is engaged with the lower structure 43, the inclined surfaces 49b of the lock parts 42b1 and 42b2 are brought into contact with the lock part receivers 47b1 and 47b2 of the lower structure 43, and projections 46b1 and 46b2 of the lower structure 43 are inserted into the depression 49 from its left.

In this embodiment, as shown in FIG. 8B showing the first embodiment, at a position where adjacent structures hit each other, one lower structure may be provided with a pair of hemispherical depressions, and the other lower structure may be provided with a pair of hemispherical elastic projections made of an elastic material such as rubber at corresponding positions. When the arm extends, and the lower structure group extends and engages with the upper structure group, the lower structures rotate and hit with one another. However, the elastic projections are fitted into the depressions. Of course, the depressions and the elastic projections need not be hemispherical, and may be any depressions and elastic projections corresponding to the depressions.

Shown is the case where a depression is provided at around the center the both sides of a lower structure located forward at the time of extension, and a corresponding rubber projection is provided at around the center on the both sides of a lower structure connected rearward. It is also possible to provide a rubber projection at around the center on the both sides of a lower structure located forward at the time of extension, and provide a depression 31 at around the center on the both sides of a lower structure connected rearward.

Like the first embodiment, this configuration of this embodiment produces the effect of suppressing, by the elasticity of the elastic projection, a shock and a noise caused when lower structures come into contact with each other.

In addition, not only for the contact portions of lower structures, but also those of upper structures and of an upper structure and a lower structure, the elastic projection and depression may be provided. This produces the effect of suppressing a shock and a noise.

In the present invention, the structures to be engaged are referred to as an upper structure and a lower structure for convenience. However, the upper structure is not always located, above the lower structure. During an operation, for example, when the arm part is rotated by a rotational joint, the lower structure may be located above the upper structure.

In the above-described embodiments, the upper structure is shifted from the lower structure by half the length when they are engaged. This configuration is advantageous in strength. However, in the present invention, the upper structure may be shifted from the lower structure by a length different from half the length, or may not be shifted at all when they are engaged. In addition, the upper structure and the lower structure need not always have the same length.

In the above-described embodiments, an uneven groove is provided at the center of the lower surface of the upper structure, and lock parts are provided on its respective sides. However, the uneven groove may not be provided at the center of the lower surface, but may be provided closer to one side. In addition, the lock parts need not be symmetrically provided, or the number of the lock parts need not be two. The lock parts may be provided asymmetrically; and there may be one lock part on the upper structure.

According to the embodiments of the present invention, an extensible and retractable arm mechanism and a robot arm which are reliably and smoothly extendable and retractable.

While certain embodiments of the present invention have been described, these embodiments have been presented by way of example only and are not intended to limit the scope of the inventions. Indeed the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such embodiments or modifications as would fall within the scope and spirit of the inventions recited in the claims.

The invention claimed is:

1. An extensible and retractable arm mechanism, comprising:
   an arm and a hand connected to an end of the arm; and
   an arm support that supports the arm so as to be extensible and retractable,
   wherein the arm comprises:
      a plurality of first structures bendably coupled in a direction perpendicular to an extending direction of the arm; and
      a plurality of second structures bendably coupled in a same direction as the first structures bendably coupled,
   wherein the first structures and the second structures are restricted from being bent and form a linear body having a predetermined rigidity in a linear state when being arranged linearly and placed one upon another, and
   the first structures and the second structures become bendable in a bendable state when separating from one another;
   wherein, in the arm support, the first structures are the second structures are bendably arranged along one another;
   wherein:
      each of the first structures comprises a projection projecting toward the second structures;
      each of the second structures comprises first and second engaging parts configured to be engaged with the projection of each of the first structures;
      the projection is engaged with the first engaging part of one of the second structures, and engaged with the second engaging part of another one of the second structures, the one and the another one of the second structures being coupled directly to one another; and
   wherein:
      when the first and second structures shifts from the bendable state to the linear state, one of the second structures rotates to come into contact with another one of the second structures, such that the projection of one of the first structure comes into contact with the first engaging part of the one of the second structures and the second engaging part of the another one of the second structures, and thereby the projection becomes sandwiched between the first engaging part of the one of the second structures and the second engaging part of the another one of the second structures; and
      a front surface of the projection facing a moving direction and a rear surface of the second engaging part contacted with the front surface of the projection are both inclined relative to a longitudinal direction of the linear form of the first structures and the second structures.

2. The extensible and retractable arm mechanism according to claim 1,
   wherein:
      the projection and first engaging part comprise pin and pin hole configured to be engaged with the pin, respectively; or the projection and first engaging part comprises pin hole and pin configured the pin, respectively.

3. The extensible and retractable arm mechanism according to claim 1,
wherein the projection is arranged at around a center on each of the first structures along the direction in which the first structures are coupled.

* * * * *